(12) United States Patent
Guidash

(10) Patent No.: US 7,830,435 B2
(45) Date of Patent: Nov. 9, 2010

(54) IMAGE SENSOR AND IMAGE CAPTURE SYSTEM WITH EXTENDED DYNAMIC RANGE

(75) Inventor: Robert M. Guidash, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1430 days.

(21) Appl. No.: 10/654,313

(22) Filed: Sep. 3, 2003

(65) Prior Publication Data

US 2005/0045980 A1    Mar. 3, 2005

(51) Int. Cl.
*H04N 3/14* (2006.01)
(52) U.S. Cl. ...................... 348/297; 348/273
(58) Field of Classification Search .................. 348/297
See application file for complete search history.

(56) References Cited

U.S. PATENT DOCUMENTS

| | | | |
|---|---|---|---|
| 3,971,065 A * | 7/1976 | Bayer | .......................... 348/276 |
| 6,069,377 A | 5/2000 | Prentice et al. | |
| 6,307,195 B1 | 10/2001 | Guidash | |
| 6,486,504 B1 | 11/2002 | Guidash | |
| 6,665,010 B1 * | 12/2003 | Morris et al. | ............... 348/297 |
| 6,714,239 B2 * | 3/2004 | Guidash | .................. 348/223.1 |
| 6,747,698 B2 * | 6/2004 | Abe | ........................... 348/273 |
| 6,831,691 B1 * | 12/2004 | Takada et al. | ............... 348/308 |
| 6,943,837 B1 * | 9/2005 | Booth, Jr. | .................... 348/297 |
| 6,999,119 B1 * | 2/2006 | Shibazaki et al. | ........... 348/273 |
| 7,030,917 B2 * | 4/2006 | Taubman | ..................... 348/273 |

FOREIGN PATENT DOCUMENTS

| | | | |
|---|---|---|---|
| EP | 0 913 869 A2 | 5/1999 | |
| EP | 1 227 661 A2 | 7/2002 | |

* cited by examiner

*Primary Examiner*—Luong T Nguyen
(74) *Attorney, Agent, or Firm*—Peyton C. Watkins; Nancy R. Simon

(57) ABSTRACT

An image sensor includes a plurality of pixels; a color filter pattern spanning at least a portion of the pixels, wherein the color filter pattern forms a color filter kernel having colors in a predetermined arrangement; and a mechanism for controlling integration time of the pixels, wherein the integration time of the plurality of pixels is spatially variant in a pattern that is correlated with the color filter array kernel.

10 Claims, 4 Drawing Sheets

IMAGE SENSOR AND IMAGE CAPTURE SYSTEM WITH EXTENDED DYNAMIC RANGE

FIELD OF THE INVENTION

The present invention pertains to semiconductor-based image sensors with increased dynamic range.

BACKGROUND OF THE INVENTION

Solid state image sensors are now used extensively in many types of image capture applications. The two primary image sensor technologies utilized are Charge Coupled Devices CCD and CMOS x-y addressable devices. Currently, there exists many different specific embodiments of both technologies, including Active Pixel Sensors (APS) and Passive Pixel Sensors (PPS) for CMOS x-y addressable devices. All are basically comprised of a set or array of photodetectors that convert incident light into an electrical signal that can be readout and used to construct an image correlated to the incident light pattern. The exposure or integration time for the array of photodetectors can be controlled by well known mechanisms. The signal represents the amount of light incident upon a pixel photosite. The dynamic range (DR) of an imaging sensing device is defined as the ratio of the effective maximum detectable signal level, typically referred to as the saturation signal, ($V_{sat}$), with respect to the rms. noise level of the sensor, ($\sigma_{noise}$). This is shown in Equation 1.

$$\text{Dynamic Range} = V_{sat}/\sigma_{noise} \quad \text{Equation 1:}$$

Image sensor devices such as charge coupled devices (CCD) that integrate charge created by incident photons have dynamic range limited by the amount of charge that can be collected and held in a given photosite, ($V_{sat}$). For example, for any given CCD, the amount of charge that can be collected and detected in a pixel is proportional to the pixel area. Thus for a commercial device used in a megapixel digital still camera (DSC), the number of electrons representing Vsat is on the order of 13,000 to 20,000 electrons. If the incident light is very bright and creates more electrons that can be held in the pixel or photodetector, these excess electrons are extracted by the anti-blooming mechanism in the pixel and do not contribute to an increased saturation signal. Hence, the maximum detectable signal level is limited to the amount of charge that can be held in the photodetector or pixel. The DR is also limited by the sensor noise level, $\sigma_{noise}$. Due to the limitations on Vsat, much work has been done in CCD's to decrease $\sigma_{noise}$ to very low levels. Typically, commercial megapixel DSC devices have a DR of 1000:1 or less.

The same limitations on DR also exist for APS and PPS devices. The $V_{sat}$ is limited by the amount of charge that can be held and isolated in the photodetector. Excess charge is lost. This can become even more problematic with APS and PPS compared to CCD due to the active and passive components within the pixel, limiting the area available for the photodetector, and due to the low voltage supply and clocks used in CMOS devices. In addition, since APS devices have been used to provide image sensor systems on a chip, the digital and analog circuits used on APS devices such as timing and control and analog to digital conversion, that are not present on CCD's, provide a much higher noise floor on APS devices compared to CCD. This is due to higher temporal noise as well as possibly quantization noise from the on-chip analog to digital converter.

In commonly assigned U.S. Pat. No. 6,069,377, issued May 30, 2000, entitled IMAGE SENSOR INCORPORATING SATURATION TIME MEASUREMENT TO INCREASE DYNAMIC RANGE, by Prentice et al., Prentice discloses the prior art approaches to extending dynamic range of APS devices, and discloses a new invention to extend dynamic range. This method has the disadvantage of requiring more than four transistors per pixel and limits the size of the pixel that can be made. In U.S. Pat. No. 6,307,195, issued Oct. 23, 2001, entitled VARIABLE COLLECTION OF BLOOMING CHARGE TO EXTEND DYNAMIC RANGE, and U.S. Pat. No. 6,486,504, issued Nov. 26, 2002, entitled CMOS IMAGE SENSOR WITH EXTENDED DYNAMIC RANGE, both by Guidash, Guidash discloses extending dynamic range by collection of the charge that blooms from the photodetector, and by co-integration of the photodetector and floating diffusion within a single pixel. These approaches have the potential disadvantage of spatial variation of the photodetector saturation level contributing to fixed pattern noise in the sensor, and does not increase the sensitivity of the sensor.

Prior art APS devices also suffer from poor sensitivity to light due to the limited fill factor induced by integration of active components in the pixel, and by loss of transmission of incident light through the color filter layer placed above the pixel.

From the foregoing discussion it should be apparent that there remains a need within the prior art for a device that retains extended dynamic range while retaining low fixed pattern noise, small pixel, and high sensitivity.

SUMMARY OF THE INVENTION

The present invention provides a means to control the integration separately for any given spatial pattern on the image sensor, and more specifically for a pattern that is compatible with one or two dimensions of the kernel in the CFA pattern. This is done by providing separate TG or RG busses for pixels in a given row or set of rows, or by providing any means to control integration time separately for a given pattern of pixels in the image sensor array. By doing so, valid data is always available for the dark and bright regions of an image simultaneously.

Advantageous Effect of the Invention

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1A:
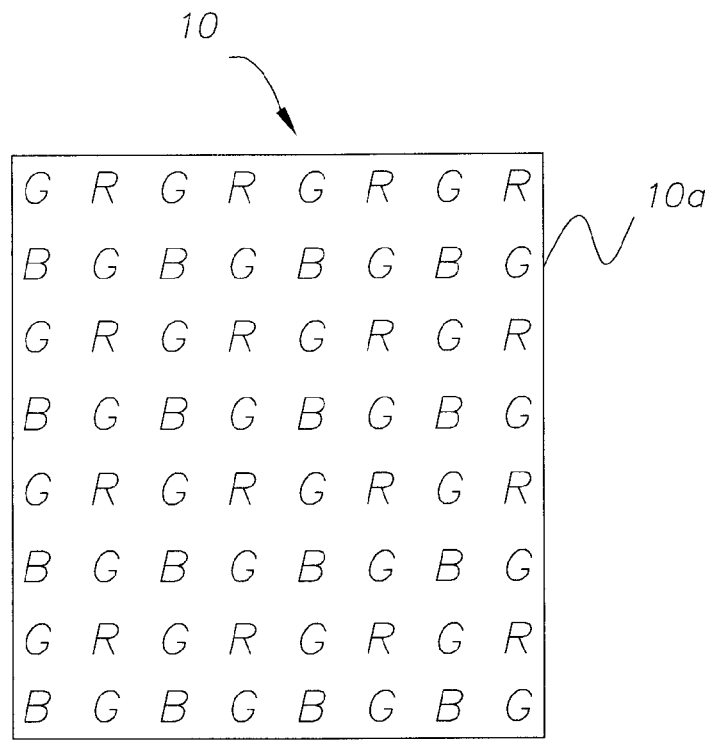
FIG. 1a is a prior art pixel array.
Figure 1B:
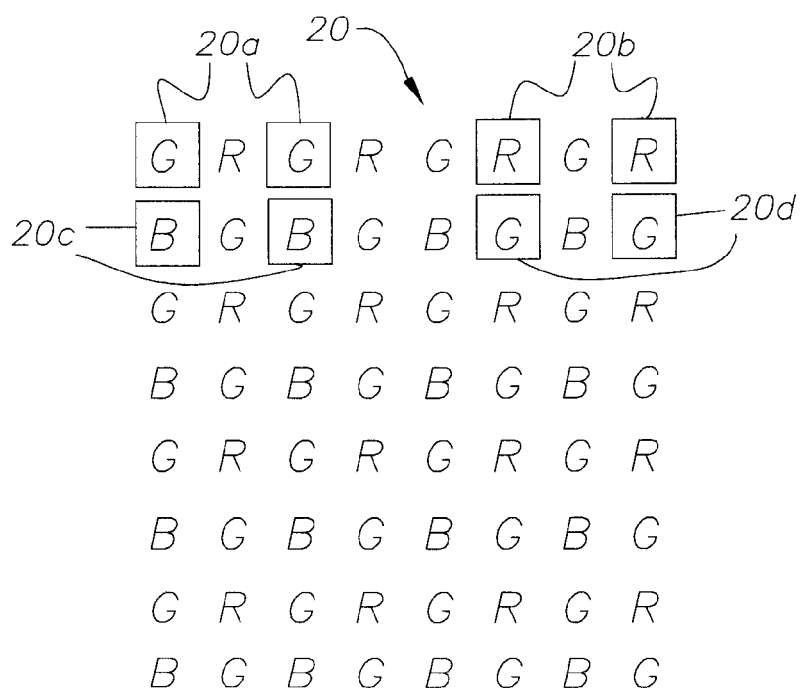
FIG. 1b is another prior art pixel array.

Typical prior art image sensor pixel arrays are shown in FIGS. 1a and 1b. The image sensor in FIG. 1a can be of any technology type such as CCD or CMOS APS. The pixel array 10 in FIG. 1a comprises a set of photodetectors. The integration time is constant for each pixel. The drawback of this approach is that if the integration time is long, pixels in the bright areas of an image will become saturated and the image details in the bright region will be lost. If the integration time is chosen to be short, the image quality in dark regions of the image will be poor due to low signal and high noise. The image sensor in FIG. 1b was disclosed in U.S. patent application Ser. No. 08/960,418, filed Jul. 17, 2002, entitled ACTIVE PIXEL SENSOR WITH PROGRAMMABLE COLOR BALANCE, by Guidash, in which each color of the pixel array 20 associated with the CFA pattern has a separate integration time to achieve charge domain white balance. This has the same drawbacks as those cited for the image sensor pixel array in FIG. 1a.

Figure 2A:
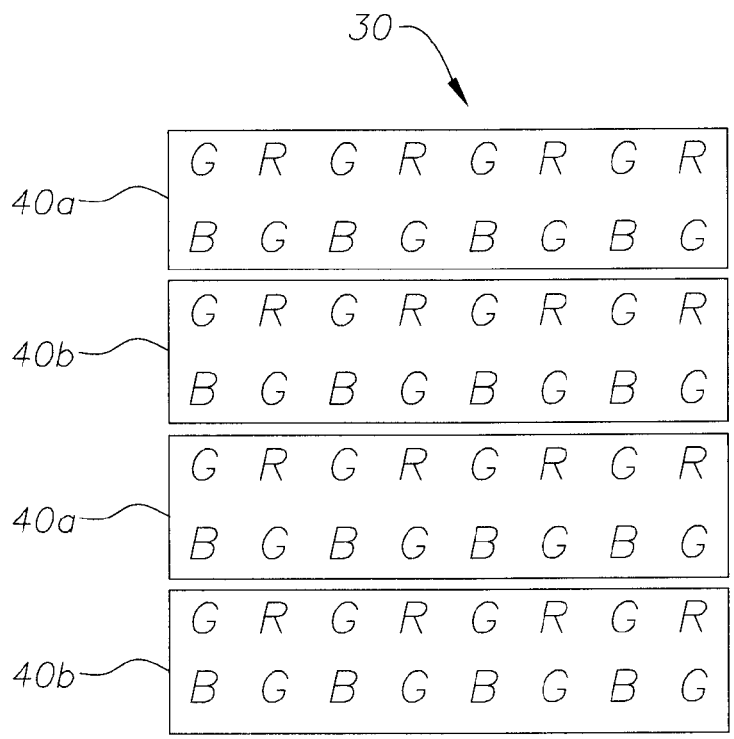
FIG. 2a is a pixel array of the present invention.
Figure 3:
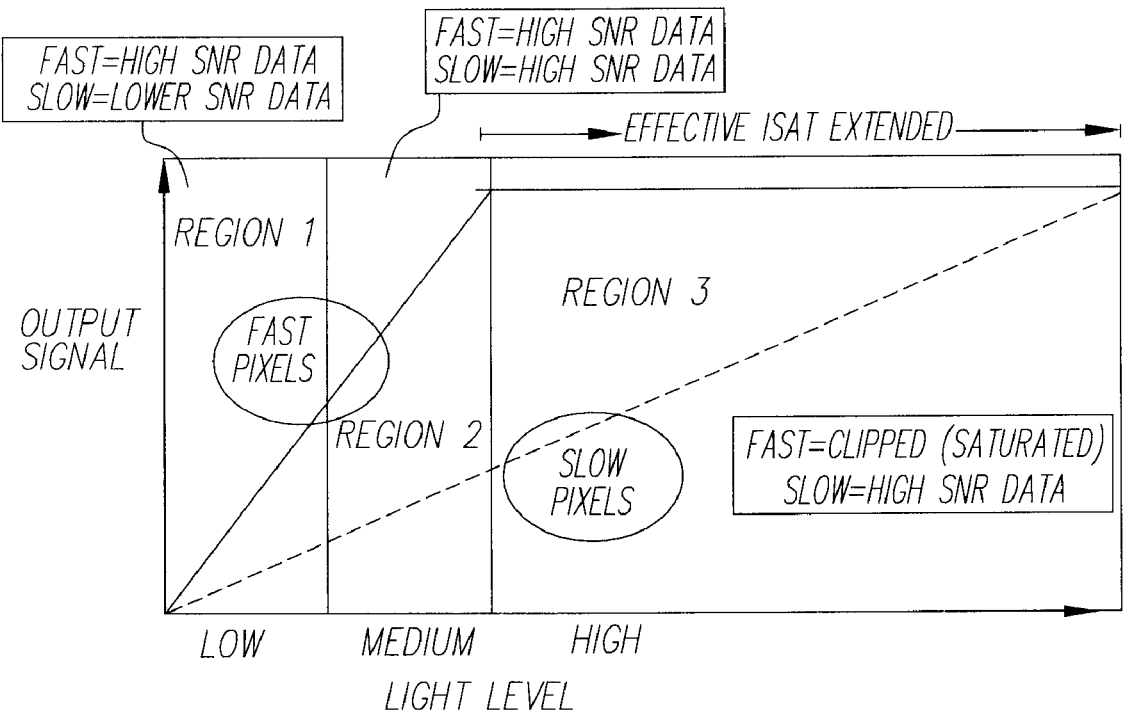
FIG. 3 is graph graphically illustrating the implementation of FIGS. 2a and 2b.

Referring to FIG. 2a, the image sensor pixel array 30 of the present invention includes an array that facilitates different programmable integration times, but in a different spatial pattern than that shown in FIG. 1b. For an x-y addressable CMOS image sensor this can be accomplished with separate transfer gates or reset gates. For a CCD image sensor this can be accomplished by having separate transfer gates. The image sensor pixel array 30 in FIG. 2a is constructed to have pixels with two different integration times for mated pairs of rows 40a and 40b that are correlated with the color filter array pattern pitch or kernel. Pixels with long integration times are referred to as fast pixels. Pixels with short integration times are referred to as slow pixels. In the case of the Bayer CFA pattern, this is a two-row pitch. By having separate integration times in this pattern, the effective dynamic range of the image sensor is extended as shown in FIG. 3. In region 1, low light level region, both the slow and fast pixels of the sensor have not saturated. The fast pixels will have signal levels that are well above the noise floor. The slow pixels will have signal levels that are within a predetermined ratio compared to the sensor noise floor. In region 2, both the slow and fast pixels have not saturated, and both have adequate signal-to-noise ratio. In region 3, high light level regions, the fast pixels have saturated or clipped and do not contain valid signal level information. The slow pixels have not saturated and do contain valid signal level information with adequate signal to noise ratio. Since the valid information is correlated with the CFA pattern, the missing information from the fast pixels can be determined by interpolation of the slow pixels. With the separate integration time architecture shown in FIG. 3, a single frame capture is taken, and spatially adaptive image processing performed. In region 2, standard prior art color image processing methods are employed to render an image. For an area of pixels in the image capture that fall into region 3, interpolation of the slow pixels is used to determined the missing signal information in the fast pixels. This results in a loss of true MTF in the extremely bright areas of the image, but leads to an effectively higher saturation illumination level, Isat. This effectively extends the intra-scene dynamic range of the image sensor. Although true spatial resolution is degraded in the extreme bright regions, the image content that would otherwise be lost in the image capture is preserved.

The sensor architecture of FIG. 2a is designed to provide an integration time pattern with two rows of a first integration time, and the two adjacent rows with a second integration time. This can be accomplished with any type of image sensor by having multiple or separate controls for integration time in this pattern. For CMOS and other x-y addressable image sensors this can be accomplished simply by having the image sensor timing arranged with two separate sets of integration pointers that are applied to the pairs of alternating rows signal lines that control integration time. This could be transfer gate lines in each row, or reset gates lines in each row, or any other per row signal that is used to control integration time for that row. In the case of CCD image sensors, this requires that the transfer gate interconnects are constructed so that there are separate and isolated connections to the transfer gate lines for at least alternating pairs of rows.

Figure 2B:
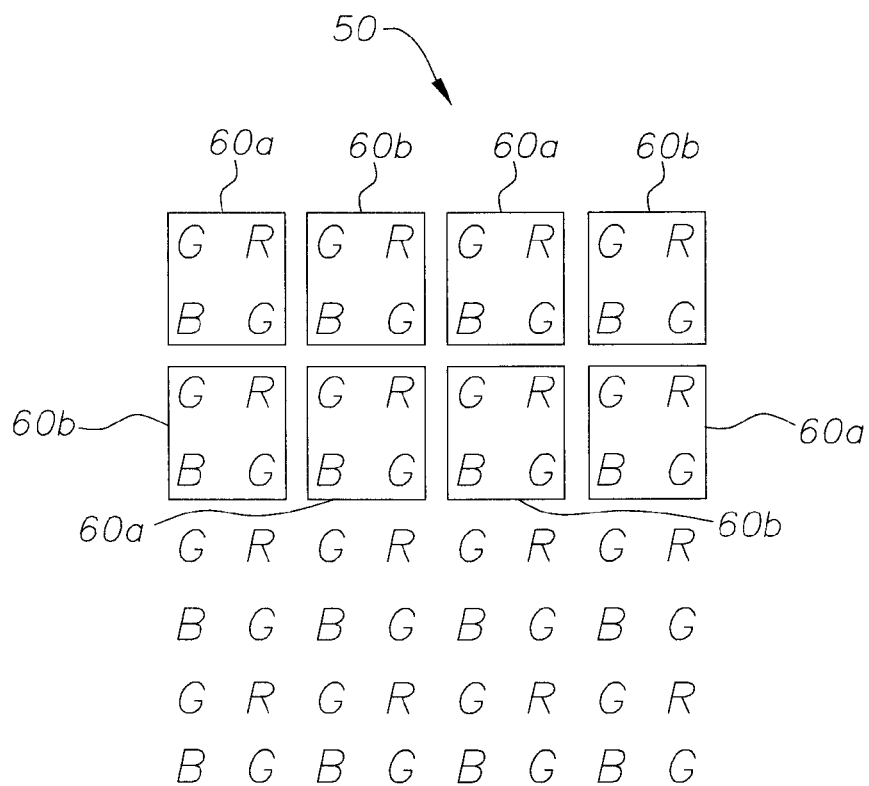
FIG. 2b is an alternative embodiment of the present invention.

A second embodiment of the present invention is shown in the array in FIG. 2b. In this embodiment, the sensor array 50 is constructed to have two separate and programmable integration times in a 2 by 2 pixel pattern 60a and 60b. In the case of an x-y addressable image sensor technology, this is achieved by having multiple signal lines per row that are used to control integration time, such as transfer gate or reset gate. These multiple signal lines per row are connected to alternating pairs of pixels to produce the integration time pattern shown in FIG. 2b.

Figure 4A:
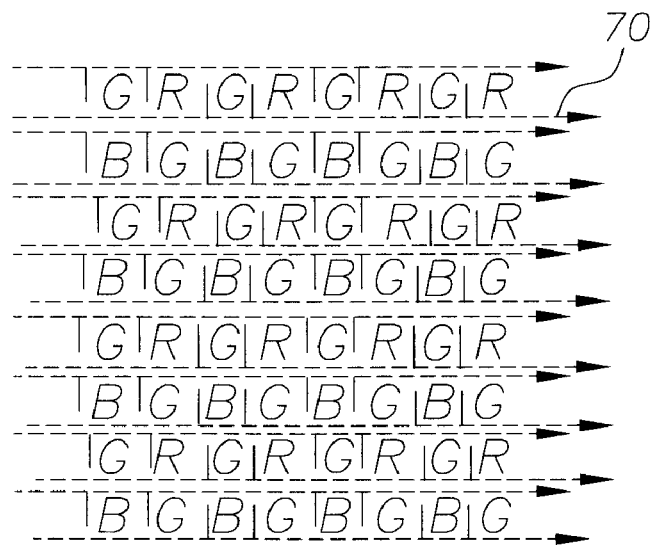
FIG. 4a is an illustration of two integration control lines per row.
Figure 4B:
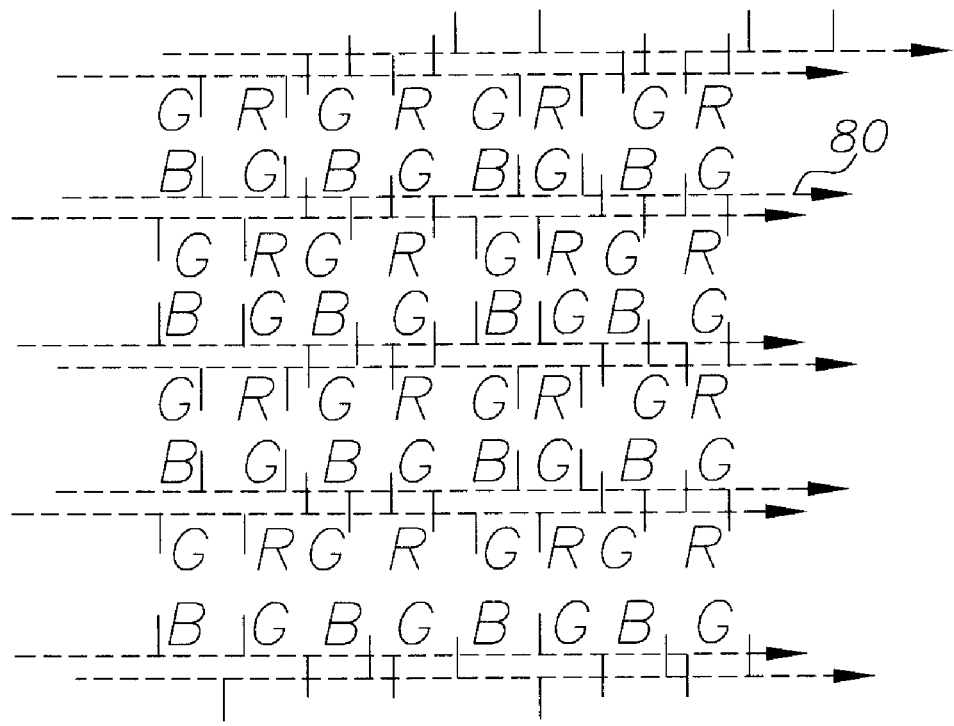
FIG. 4b is an illustration of one integration time signal line per row.

Referring to FIG. 4a, the routing of the multiple signal lines 70 that control integration time is shown. One disadvantage with routing multiple signal lines 70 to control integration time for each row is reduction of fill factor or a larger pixel size in order to fit the extra signal lines into the pixel pitch. This is overcome by the signal line routing architecture shown in FIG. 4b. In this case a single integration time control line 80 is used per row, but it is actually routed to pixels in two adjacent rows. The signal line 80 in the adjacent row is routed in a similar manner to create the integration time pattern shown in FIG. 2b. With this approach, although a single row of data is readout from the sensor at one time, the pixels contained within the data stream are from physically adjacent rows in the array. In order to properly reconstruct the image, the interlaced data must be corrected in the camera image memory. This is also a feature of the present invention. Since either on-chip or in-camera memory can be set up to write data into two or more row locations, there is no need to have the sensor read out all pixels from a physical row at the same time.

As previously discussed, this provides an image sensor and image capture system with wide intra-scene dynamic range and wide exposure latitude. A single image capture can render a full range of image information with optimization of the integration time for low light levels without clipping signal information in the high light regions of an image. This can greatly simplify the exposure control system and algorithms in an imaging system since choice of exposure or integration time does not need to be as precise.

It should also be noted that an image capture system using such a sensor can be used to measure or determine the dynamic range of a scene to set the two integration times appropriately. During the metering phase of a camera system, two widely separated integration times can be used to determine the maximum and minimum light levels in the scene. The two integration times can then be adjusted to cover the range of illumination in the scene. For example, if the dynamic range of the scene to be captured is within the inherent dynamic range of the image sensor, then the two integration times can be set to the same value. If the scene contains a dynamic range that is wider than the true dynamic range of the sensor, then the two integration times can be set to match or optimally cover the dynamic range of the scene.

Figure 5:
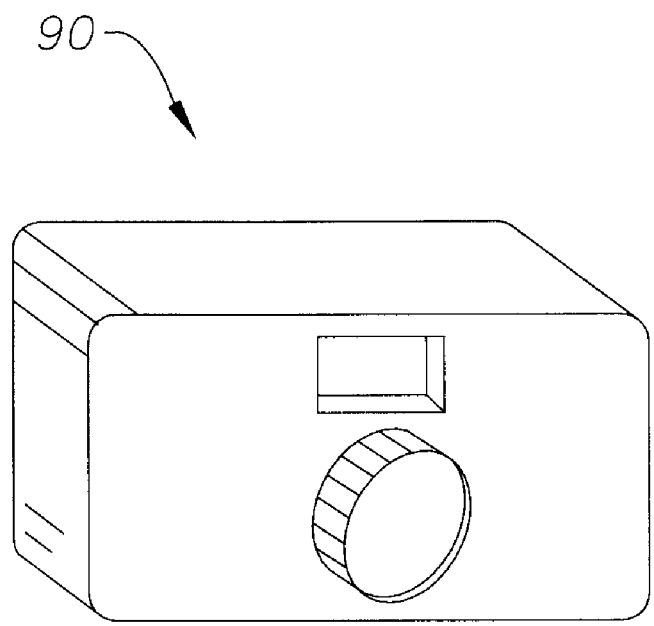
FIG. 5 is a camera for implementing the pixel array of FIGS. 2a and 2b into a preferred commercial embodiment.

Referring to FIG. 5, there is shown a camera 90 for implementing the image sensor of the present invention is one of many consumer-oriented commercial embodiments.

The invention has been described with reference to a preferred embodiment. However, it will be appreciated that variations and modifications can be effected by a person of ordinary skill in the art without departing from the scope of the invention.

PARTS LIST 10 pixel array
20 pixel array
30 pixel array
40a mated pair of rows
40b mated pair of rows
50 sensor array
60a 2 by 2 pixel pattern
60b 2 by 2 pixel pattern
70 multiple signal line
80 single integration time control line
90 camera

What is claimed is:

1. An image sensor comprising:
   a plurality of pixels arranged in an array of rows and columns;
   a color filter pattern spanning at least a portion of the pixels, wherein the color filter pattern forms a plurality of color filter kernels having at least one color of every color in the color filter pattern in a predetermined arrangement with an identical pattern of colors in each color filter kernel, and wherein the color filter kernels are arranged in at least two different uniformly distributed sets that are correlated with the color filter pattern; and
   a mechanism for independent control of an integration time of each color filter kernel according to its spatial location, wherein at least one color filter kernel includes at least one fast pixel having a first integration time and at least one slow pixel having a second integration time, wherein the first integration time is longer than the second integration time and data from at least one slow pixel includes valid signal level information with adequate signal to noise ratio while data from at least one fast pixel does not contain valid signal level information.

2. The image sensor as in claim 1, wherein the color filter pattern is a Bayer color filter pattern.

3. The image sensor as in claim 1, wherein the plurality of color filter kernels each comprise a 2×2 kernel.

4. The image sensor as in claim 1, wherein the plurality of color filter kernels comprises an alternating pattern of two lines at one integration time and adjacent two lines at another integration time.

5. The image sensor of claim 1, further comprising a signal line for each row of pixels in the array, wherein each signal line is routed to at least a portion of the pixels in two adjacent rows based on the arrangement of the color filter kernels.

6. A camera comprising:
   an image sensor comprising:
      a plurality of pixels arranged in an array of rows and columns;
      a color filter pattern spanning at least a portion of the pixels, wherein the color filter pattern forms a plurality of color filter kernels having at least one color of every color in the color filter pattern in a predetermined arrangement with an identical pattern of colors in each color filter kernel, and wherein the color filter kernels are arranged in at least two different uniformly distributed sets that are correlated with the color filter pattern; and
      a mechanism for independent control of an integration time of each color filter kernel according to its spatial location, wherein at least one color filter kernel includes at least one fast pixel having a first integration time and at least one slow pixel having a second integration time, wherein the first integration time is longer than the second integration time and data from at least one slow pixel includes valid signal level information with adequate signal to noise ratio while data from at least one fast pixel does not contain valid signal level information.

7. The camera as in claim 6, wherein the color filter pattern is a Bayer color filter pattern.

8. The camera as in claim 6, wherein the color filter kernels each comprise a 2×2 kernel.

9. The camera as in claim 6, wherein the plurality of color filter kernels comprises an alternating pattern of two lines at one integration time and adjacent two lines at another integration time.

10. The camera of claim 6, wherein the image sensor further comprises a signal line for each row of pixels in the array, wherein each signal line is routed to at least a portion of the pixels in two adjacent rows based on the arrangement of the color filter kernels.

* * * * *